July 7, 1970     D. D. ANDERSON     3,518,719
FISH HOLDING RACK
Filed Oct. 11, 1967
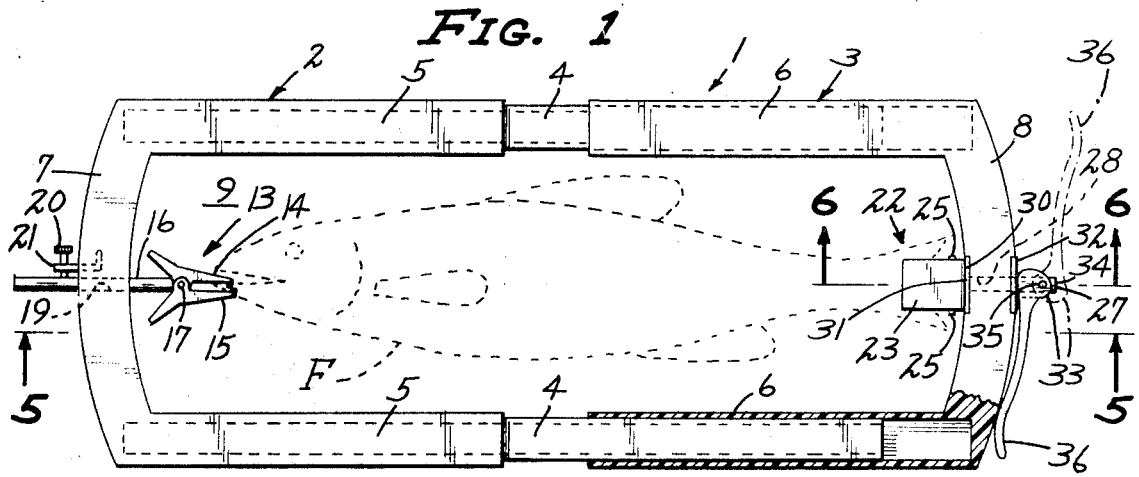
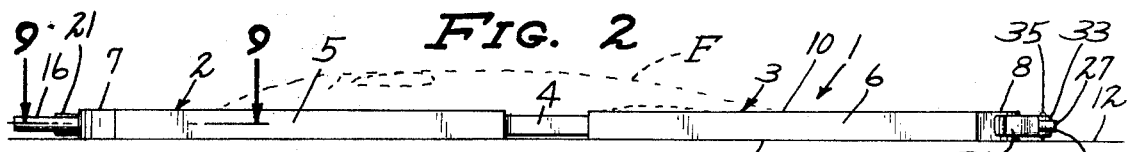
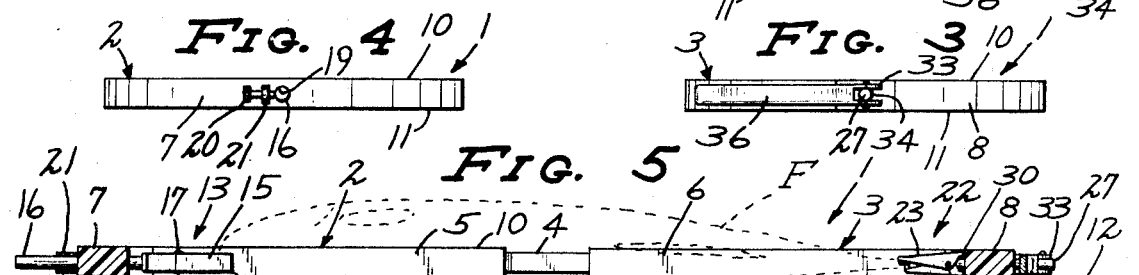
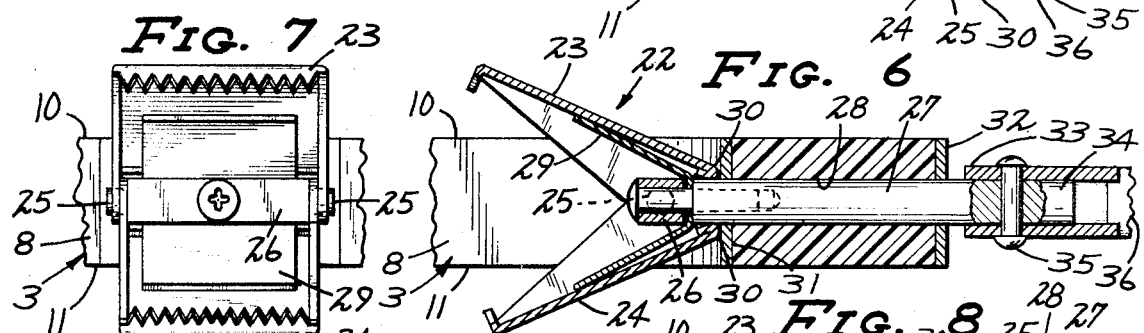
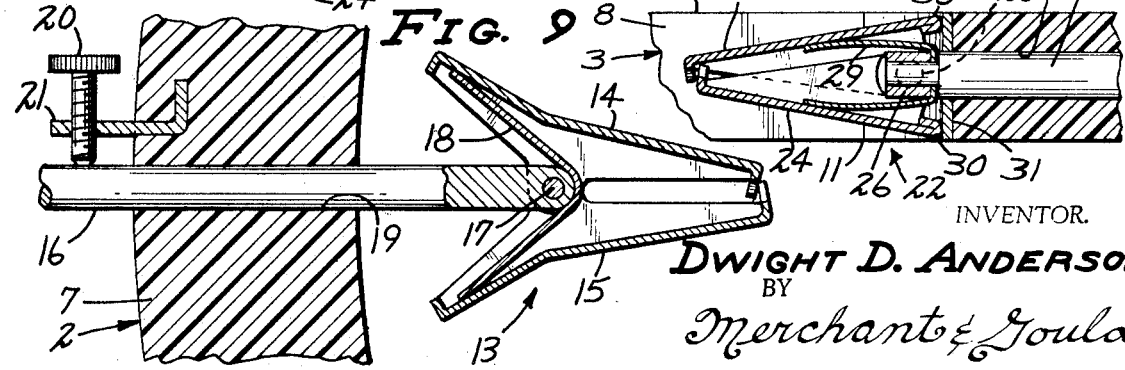
INVENTOR.
DWIGHT D. ANDERSON
BY
Merchant & Gould
ATTORNEYS

United States Patent Office 3,518,719
Patented July 7, 1970

3,518,719
FISH HOLDING RACK
Dwight Dean Anderson, 218 W. Broadway,
Box 759, Lewistown, Mont. 59457
Filed Oct. 11, 1967, Ser. No. 674,400
Int. Cl. A22c 25/06
U.S. Cl. 17—70                     4 Claims

ABSTRACT OF THE DISCLOSURE

An elongated generally rectangular frame having generally flat top and bottom surfaces and defining a fish-receiving opening, and fish engaging clamps in said opening adjacent opposite ends of the frame. Means is provided for adjusting the position of one of the clamps longitudinally of the frame, the frame being longitudinally adjustable to accommodate fish of different lengths. One of the clamps is provided with means for opening the jaws thereof, said means and said clamps in their jaw closed positions being disposed wholly between generally flat planes defined by the top and bottom surfaces of the frame.

BACKGROUND OF THE INVENTION

Heretofore, various types of fish holding apparatus have been used in the preparation of fish, these utilizing one or more clamps, hooks or other devices for holding the fish securely during the scaling, skinning, steaking or other cleaning operations. Devices of this kind are disclosed in such U.S. Pats. as 1,259,109; 1,438,091; 1,632,-194; Re. 24,194; 2,945,256 and 3,093,859. Some of these require removal of the fish therefrom and replacing the fish in an inverted position when working on opposite sides of the fish, others having pivoted clamp arrangements whereby the fish may be inverted relative to a supporting frame or base.

SUMMARY OF THE INVENTION

An object of this invention is the provision of a fish holding rack which is capable of resting flat on a work table or bench during the fish cleaning operation, so that the same is easily held against movement on the table.

Another object of this invention is the provision of a rack, which, when work on one side of a fish is completed, may be inverted on the table to lie flat thereon, enabling easy access to be had to the opposite side of the fish.

Another object of this invention is the provision of a rack which is quickly and easily adjusted to accommodate fish of a wide variety of sizes, and in which the fish is quickly and securely held.

To the above ends, the fish holding rack of this invention comprises an elongated generally rectangular open frame, having generally flat top and bottom surfaces, and defining a fish-receiving opening. The frame includes a pair of opposed generally U-shaped frame sections longitudinally slidably connected by a pair of connecting bars extending longitudinally of the frame. A pair of fish holding clamps are disposed in the opening each adjacent a different end of the frame, one of the clamps being mounted for adjustment longitudinally of the frame, the other clamp having means for closing the same mounted to the adjacent end of the frame. The clamps in their operative clamping positions, means for mounting the clamps, and means for closing said other clamp are wholly contained between generally flat parallel planes defined by the top and bottom surfaces of the frame, so that the frame will lie flat on either its top or bottom surface.

DESCRIPTION OF THE DRAWINGS

FIG. 1 is a view in top plan of a fish holding rack produced in accordance with this invention, some parts being broken away and some parts being shown in section;
FIG. 2 is a view in side elevation;
FIG. 3 is a view in end elevation as seen from the right with respect to FIGS. 1 and 2;
FIG. 4 is a view in end elevation as seen from the left with respect to FIGS. 1 and 2;
FIG. 5 is a longitudinal section taken substantially on the line 5—5 of FIG. 1;
FIG. 6 is an enlarged fragmentary section taken on the line 6—6 of FIG. 1;
FIG. 7 is a fragmentary view in end elevation as seen from the left with respect to FIG. 6;
FIG. 8 is a fragmentary view corresponding to a portion of FIG. 6, but showing a different position of some of the parts; and
FIG. 9 is an enlarged fragmentary section taken on the line 9—9 of FIG. 2.

DETAILED DESCRIPTION

In the preferred embodiment of the invention illustrated, an elongated generally rectangular frame 1 is shown as comprising a pair of opposed generally U-shaped frame sections 2 and 3 and a pair of extension members or bars 4. The frame sections 2 and 3 comprise laterally spaced parallel hollow legs 5 and 6 respectively and respective arcuate transverse portions 7 and 8, the legs 5 and 6, transverse portions 7 and 8 and bars 4 being rectangular in cross section. The frame sections 2 and 3 and extension members or bars 4 cooperate to define an elongated generally rectangular fish-receiving opening 9 through the frame 1. Each of the legs 5 are axially aligned with a different one of the legs 6, the slidable connection between the legs 5 and 6 and their respective extension bars 4 enabling the frame 1 to be lengthened or shortened to accommodate fish of various lengths within the opening 9. A fish to be cleaned is shown by dotted lines in FIGS. 1, 2 and 5, and is indicated at F. As shown, the extension members 4 with their respective legs 5 and 6 constitute opposite sides of the frame 1, the transverse portions 7 and 8 forming the opposite ends of the frame 1. Also, as shown, the top and bottom surfaces 10 and 11 respectively of the frame 1 are generally flat and parallel whereby the frame 1 is enabled to lie flat on a work bench or table, indicated at 12, in either an upright or inverted position.

A fish holding clamp 13 comprises a pair of handle equipped toothed jaws 14 and 15 pivotally connected together and to the inner end of a mounting bar or rod 16 by a generally vertically disposed shaft or pin 17. The clamp 13 has a thickness or vertical dimension slightly less than that of the frame 1 so that the clamp 13 is disposed entirely between the planes defined by the top and bottom surfaces 10 and 11 of the frame 1. The clamp jaws 14 and 15 are yieldingly urged toward an operative jaw closed position by a leaf spring 18, see FIG. 9. As shown in FIG. 1, the jaws 14 and 15 of the clamp 13 are disposed to engage one of the jaws of the fish F, the clamp 13 being shown as engaging the lower jaw of the fish. The mounting bar or rod 16 is longitudinally slidable in an opening 19 in the transverse portion or frame end 7 of the frame 1, the opening 19 being disposed substantially on the longitudinal axis of the frame 1. The clamp 13 and its mounting bar 16 are releasably locked against movement longitudinally of the frame 1 by a locking thumb screw or the like 20 screw threaded in a bracket 21 projecting longitudinally outwardly of the end 7, the thumb screw 20 being movable into and out of engagement with the mounting bar 16. The thumb screw 20 exerts lateral pressure against the portion of the mounting bar 16 exterior of the frame end 7 to press the bar 16 against the opposite side wall portion of the opening 19 so that the bar 16 and clamp 13 are securely held against movement longitudinally of the frame 1.

A second clamp 22 is disposed within the frame opening 9 adjacent the frame end or transverse portion 8, and comprises a pair of cooperating tooth-equipped jaws 23 and 24 of substantially greater width than the jaws 14 and 15 of the clamp 13. As shown in FIGS. 1 and 5, the clamp 22 is adapted to engage the tail portion of the fish F, the jaws 23 and 24 being journalled on aligned generally horizontally disposed pins 25 on opposite ends of a cross head 26, the cross head 26 being mounted on the inner end of an elongated mounting rod or bar 27 that is axially slidably mounted in an opening 28 in the transverse portion or frame end 8. The jaws 23 and 24 of the second clamp 22 are yieldingly biased toward a jaw open position shown in FIGS. 6 and 7, by a leaf spring 29, the jaws 23 and 24 having inner ends 30 that slidably engage the inner one of a pair of inner and outer wear plates 31 and 32 secured to opposite sides of the transverse portion 8 adjacent the opening 28. It will be noted that the opening 28 is substantially axially aligned with the opening 19 in the opposite end 7 of the frame 1.

As shown in FIGS. 6 and 8, axial movement of the mounting rod or bar 27 in a direction longitudinally outwardly with respect to the frame 1, moves the crosshead 26 and it pins 25 toward the adjacent wear plate 31, causing the ends 30 of the jaws 23 and 24 to be cammed in opposite directions radially outwardly from the mounting rod or bar 27, against the wear plate 31, thus moving the jaws 23 and 24 to their jaw closed operative positions of FIG. 8, against bias of the leaf spring 29. Means for imparting jaw closing movements to the mounting bar 27 comprises a bifurcated cam element 33 that is pivotally mounted on the outer end portion 34 of the mounting bar 27 by means of a pin or rivet 35 extending transversely through the outer end portion 34 on a generally vertical axis. The cam element 33 is formed to provide an elongated handle 36 by means of which the cam may be rotated between jaw opening and jaw closing positions shown by full and broken lines respectively in FIG. 1. As shown, the cam element 33 engages the outer wear plate 32 on the transverse portion or end 8 of the frame 1 to impart jaw closing movements to the clamp 22. When the cam element 33 is moved to its jaw released position shown by broken lines in FIG. 1, the leaf spring 29 moves the clamp jaws 23 and 24 toward their jaw open positions, pulling the mounting bar 27 inwardly to its position shown in FIG. 6.

As shown in FIGS. 5 and 8, the clamp 22, in its operative jaw closed position, is disposed wholly between the planes of the top and bottom surfaces 10 and 11 of the frame 1, as are the cam element 33 and its handle 36. Thus, with neither of the clamps 13 or 22 and their associated parts projecting above or below the planes of the top and bottom surfaces respectively of the frame 1, the frame 1 is enabled to lie flat on the work surface on the bench or table 12 with the fish F supported on the table or bench within the opening 9. As shown, the thickness of the frame 1 is such that a fish of edible size projects above the top surface of the frame so that it may be easily scaled, skinned or otherwise treated while being securely held in the clamps 13 and 22.

When it is desired to clean a fish, the tail of the fish is placed between the open jaws 23 and 24 of the clamp 22 and the cam element 33 manipulated to close the jaws of the clamp 22 on the tail of the fish. The clamp 13 is then opened and one of the jaws 14 or 15 is inserted into the mouth of the fish and the clamp 13 permitted to close. Movement of the clamp 13 longitudinally toward the mouth of the fish may be accomplished by releasing the thumb screw 20 and moving the mounting bar 16 relative to the frame 1, or the frame sections 2 and 3 may be moved relative to each other, as desired. While no means has been shown for restricting longitudinal movement of the frame sections 2 and 3 relative to each other, set screws or other suitable means, not shown, may be mounted in the frame section legs 5 and 6 and disposed to engage the extension members 4 in a well known manner, if desired. However, I have found that such means are not essential inasmuch as when scaling a fish, the operator usually holds the frame 1 against the work-table 12 by pressing downwardly on the transverse portion or frame end 8, while moving the fish scaling implement from the tail of the fish F toward the head thereof. When skinning a fish, such as a cat-fish, the skin is usually removed from the head of the fish rearwardly toward the tail thereof. In this operation, the user will grasp the frame end 7 to hold the same against rearward movement while removing the skin from the fish. After one side of the fish is scaled or skinned, it is only necessary to invert the frame 1 with the fish mounted therein, thus presenting the opposite side of the fish F for scaling or skinning. The height of the frame 1 is such that the fish may be steaked or slit for disembowelment as desired while still held in the frame.

It will be appreciated that, with the use of the movable mounting bar 16 and the extension members 4, the present device will accommodate fish of minimum legal length, as well as those of very substantial length; and, when the frame sections 2 and 3 are moved longitudinally into abutting engagement of the legs 5 with the legs 6, the device assumes a size permitting it to be conveniently stored in a limited space.

What is claimed is:

1. A fish holding rack comprising:
   (a) an elongated generally rectangular frame comprising a pair of opposed generally U-shaped frame sections each having a pair of laterally spaced parallel legs and a transverse portion, and means connecting each leg of one section to a corresponding leg on the other section and in alignment therewith for movement of one of the frame sections longitudinally of the other frame section, said leg and transverse portions comprising sides and ends respectively of said frame and cooperating to define a generally direct angular fish receiving opening, said frame having generally front top and bottom surfaces;
   (b) first and second fish-holding clamps each disposed in said opening adjacent a different one of said frame ends and each including a pair of cooperating jaws pivotally connected for movements between jaw open and jaw closed positions;
   (c) first and second mounting members longitudinally movably mounted each in a different frame end and each having an inner end connected to a respective one of said first and second clamps;
   (d) locking means engaging said first mounting member for releasably locking said first mounting member and first clamp in desired set positions longitudinally of said frame;
   (e) the jaws of said second clamp having portions engaging the adjacent frame end to impart closing movements to the jaws of said clamp responsive to movement of said second mounting member in one direction longitudinally of said frame;
   (f) and actuator means for imparting movement to said second mounting member in said one direction to close said second clamp jaws;
   (g) said movable members, locking means and second clamp jaws in the closed positions thereof, being disposed wholly between generally flat planes defined by said top and bottom frame surfaces.

2. The fish holding rack defined in claim 1 in which said legs are hollow, said last-mentioned means comprising a pair of elongated bars each telescopically slidably received in a different aligned pair of said legs.

3. The fish holding rack defined in claim 1, in which said actuator comprises a cam element pivotally mounted on said second mounting member and having camming engagement with the adjacent end of said frame.

4. The fish holding rack defined in claim 1, in which the axis of pivotal movement of said jaws of the first clamp extends in a generally vertical direction, the axis of pivotal movement of the jaws of said second clamp extending in a generally horizontal direction transversely of said frame.

References Cited

UNITED STATES PATENTS

| | | | |
|---|---|---|---|
| 1,259,109 | 3/1918 | Kugler et al. | 17—8 |
| 2,312,160 | 2/1943 | Haislip | 17—8 |
| Re. 24,194 | 8/1956 | Thornton | 17—8 |
| 2,945,256 | 7/1960 | Harper | 17—8 |
| 3,248,751 | 5/1966 | Wilborn | 17—8 |

LUCIE H. LAUDENSLAGER, Primary Examiner